United States Patent
Dini et al.

(10) Patent No.: US 8,255,535 B2
(45) Date of Patent: Aug. 28, 2012

(54) METHOD AND SYSTEM TO GENERATE EXECUTION-BASED SCHEDULING SIGNATURE FOR AN APPLICATION

(75) Inventors: Petre Dini, San Jose, CA (US); Ludwig Alexander Clemm, Los Gatos, CA (US); Cosmin Nicu Dini, San Jose, CA (US); Manuela Ionelia Popescu, Wilmington, DE (US)

(73) Assignee: Cisco Technology, Inc., San Jose, CA (US)

( * ) Notice: Subject to any disclaimer, the term of this patent is extended or adjusted under 35 U.S.C. 154(b) by 712 days.

(21) Appl. No.: 11/460,933

(22) Filed: Jul. 28, 2006

(65) Prior Publication Data

US 2008/0028075 A1    Jan. 31, 2008

(51) Int. Cl.
*G06F 15/173* (2006.01)
(52) U.S. Cl. .................. 709/226; 709/223; 709/224
(58) Field of Classification Search .......... 709/223, 709/226
See application file for complete search history.

(56) References Cited

U.S. PATENT DOCUMENTS

| 6,044,398 A * | 3/2000 | Marullo et al. ............... 709/219 |
| 2004/0139202 A1* | 7/2004 | Talwar et al. ............... 709/229 |
| 2004/0167980 A1* | 8/2004 | Doyle et al. ............... 709/225 |
| 2005/0155033 A1* | 7/2005 | Luoffo et al. ............... 718/104 |
| 2005/0240668 A1* | 10/2005 | Rolia et al. ............... 709/223 |
| 2007/0016668 A1* | 1/2007 | Rodriguez ............... 709/224 |

\* cited by examiner

*Primary Examiner* — Kenny Lin
*Assistant Examiner* — Shripal Khajuria
(74) *Attorney, Agent, or Firm* — Schwegman, Lundberg & Woessner, P.A.

(57) ABSTRACT

A method and system to profile applications are provided. The system may include a capture module to capture resources consumption data for an application and a requirements generator to generate resources requirement data for the application. The resources requirement data may be generated by the requirements generator utilizing the resource consumption data. The system may further include a profile generator to generate a profile for the application. The profile may comprise the resources consumption data and the resources requirement data.

15 Claims, 5 Drawing Sheets

METHOD AND SYSTEM TO GENERATE EXECUTION-BASED SCHEDULING SIGNATURE FOR AN APPLICATION

TECHNICAL FIELD

This application relates to a method and system to generate execution-based profile for an application.

BACKGROUND

Grid computing is a distributed computing model that allows applications to perform higher throughput computing by utilizing shared resources that may be available at a variety of networked computers. In Grid and similar environments, applications that require access to resources usually need to specify the type of the resource that they need, the quantity the resource that they need, and possibly the quality of such resources. For example, in order to execute, an application may require a certain number of ports with a certain bandwidth, a certain amount of memory, a certain amount of disk space, a certain number of interfaces of certain type, and so forth. The allocation of the shared resources is generally managed by some type of an operating system function that controls who may claim what resource at what time. Examples of policies that are used to allocate resources include scheduling (reservation for a certain time duration, e.g., reservation of ports for a voice conference that has been scheduled for a particular time), time slicing (often used to access CPU power with computer operating systems), or run-to-completion (for example, print jobs in the case of print servers).

The amount of resources requested by an application is usually based on an estimation determined by the application designer. Consequently, an amount of resources requested by the application may be different from what is really needed. In the case of reserving a certain amount of resource, if more resources are reserved than are actually needed, resources remain idle while applications that would be able to use them are delayed. As an analogy, one may think of the example of a voice conference having reserved too many ports, while other conference requests cannot be served due to lack of the ports.

In the case of run-to-completion environments, if a request for a resource is made for insufficient duration, the resource may not be released as scheduled because the task takes longer than the requested duration. In an alternative scenario, where the request had been for insufficient resources or for insufficient duration, an application may terminate abnormally.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

In order to address issues associated with efficient management of distributed resources, a method and system are presented to allow applications to make more accurate requests for resources based on actual past usage.

An example embodiment described herein comprises augmenting a distributed environment with a mechanism to keep track of actual past resource usage by applications, and to base future requests for resources on past resource consumption. Thus, in an example embodiment, the static determination of how many resources should be requested by an application is replaced by a feedback arrangement that allows associating data related to actual resource consumption by the application with the application itself. Such collection of data may be termed an application profile. An application profile may be updated each time the application consumes resources in the course of its execution, such that the profile for the application may become increasingly accurate over time. In an example embodiment, on initial deployment of an application, the amount of resources to request may be seeded, e.g., in a conventional way. The seeded values may be then adjusted in accordance with example embodiments described herein over a lifetime of the application.

An application profile, in an example embodiment, may be built and maintained by the application itself. This profile may be cryptographically signed to certify that the application maintaining the profile is deemed trustworthy by some external certification authority. In an example embodiment, a profile may be built and maintained by a host rather than by the application itself. The host may sign the entry into the profile in a way that may be deemed tamper proof.

Example embodiment may be implemented in the context of a heavily distributed network environment, e.g., a network that includes a plurality of servers that may have host resources and make such resources available to a plurality of clients. Such a network may be used, for example, to provide multiple users with access to applications, data, etc. An example of such a network is illustrated in FIG. 1.

Figure 1:
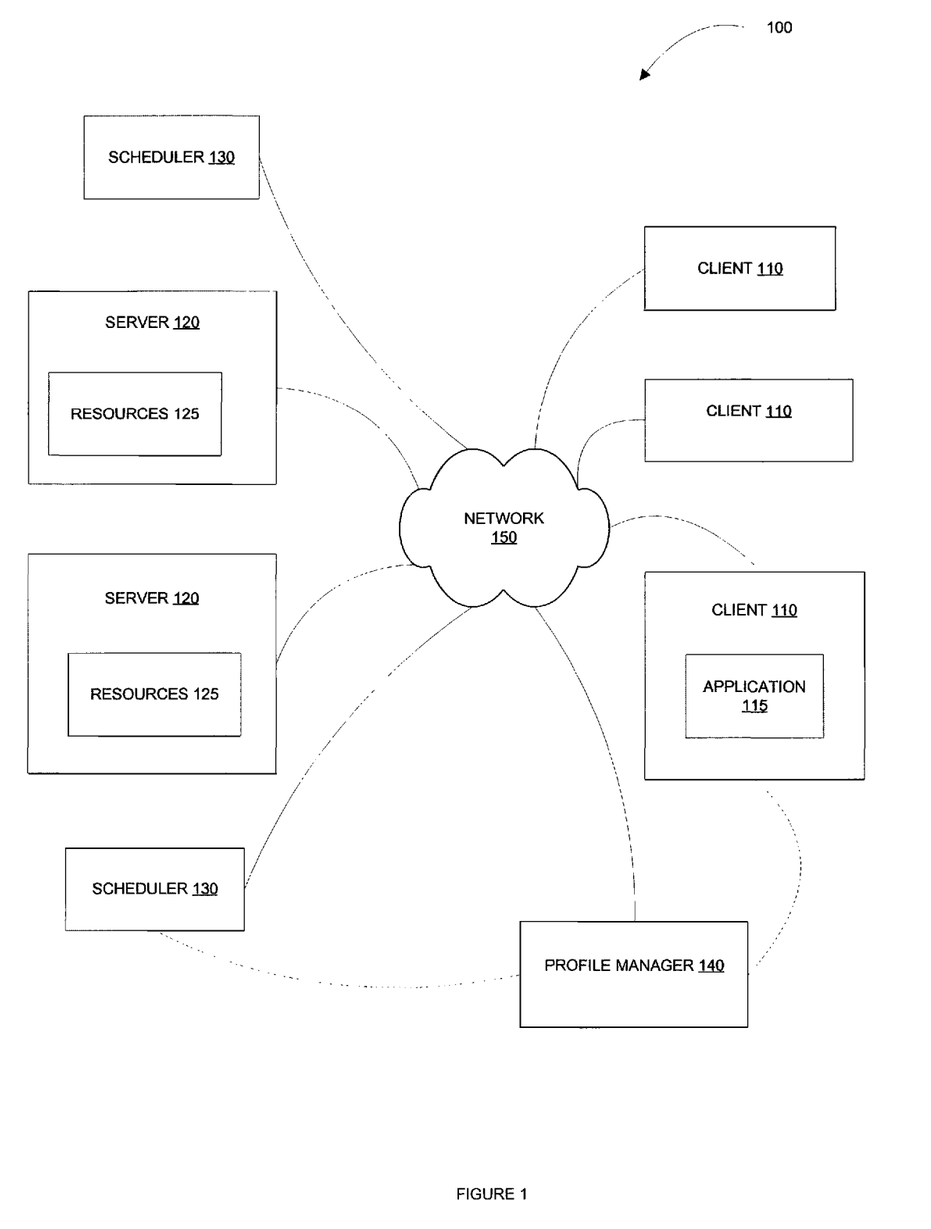
FIG. 1 shows a network environment within which an example embodiment may be implemented.

FIG. 1 illustrates a heavily distributed network environment 100. The environment 100, in an example embodiment, includes a plurality of clients 110 and a plurality of servers 120, coupled to a communications network 150. The communications network 150 may be a public network (e.g., the Internet, a wireless network, etc.) or a private network (e.g., LAN, WAN, Intranet, etc.). In the environment 100, applications 115 running on the clients 110 may be provided with an access to the resources that are available at the servers 120. For example, several of the servers 120 may have a particular compiler that may be used by the clients 110. The environment 100, in addition to the plurality of clients 110 and servers 120, may have one or more schedulers 130. The schedulers 130 may be referred to, collectively, as a distributed scheduler.

For example, when a client 110 (or an application 115 running on the client 110) requests network resources (e.g., access to a compiler in order to compile a computer program and described by way of example with reference thereto), the distributed scheduler 130 may receive the request to access or to utilize a compiler, determine if a compiler is available on any of the servers 120, determine the period of time (and/or specific resources) required to compile the computer program and reserve the compiler for the determined period of time.

As will be described by way of example in further detail below, in an example embodiment, the scheduler 130 may receive profile information associated with the requesting application 115 in addition to the request for resources. The profile information may be provided to the scheduler 130 via a profile manager 140. Although the profile manager 140 is illustrated in FIG. 1 as a standalone entity, it will be noted that the profile manager 140 may reside on the client system 110, on any of the server systems 120, be incorporated into the scheduler 130. In an example embodiment, the profile manager 140 may be incorporated into the requesting application 115. The profile manager 140 may be configured to generate and to store an execution-based profile for an application.

As mentioned above, an execution-based profile for an application may be advantageously utilized to increase efficiency of the resources utilization in a distributed system. An example method of generating an application profile is described with reference to FIG. 2.

Figure 2:
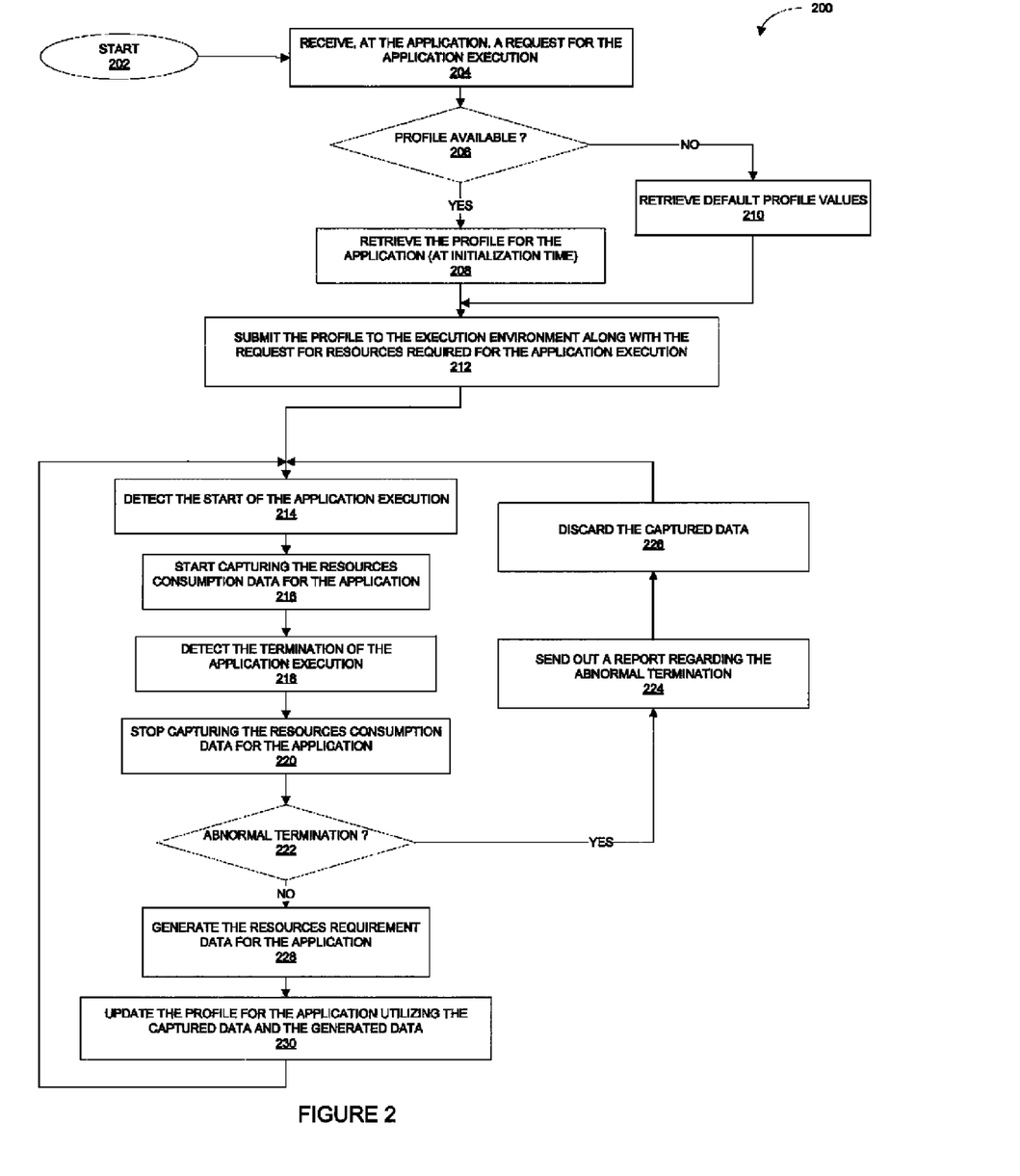
FIG. 2 shows a method, in accordance with an example embodiment, to profile an application.

FIG. 2 is a flow chart of a method 200 to generate a profile for an application, according to an example embodiment. The method 200 may be performed by processing logic that may comprise hardware (e.g., dedicated logic, programmable logic, microcode, etc.), software (such as run on a general purpose computer system or a dedicated machine), or a combination of both. In an example embodiment, processing logic resides at a computer system that hosts the profile manager 140 of FIG. 1. In an example embodiment, the processing logic may reside at a client 110, at a server 120 or may be distributed between a client 110 and a server 120 of FIG. 1.

As shown in FIG. 2, the method 200 commences at operation 202. At operation 204, the processing logic detects the start of the application execution and starts capturing the resources consumption data for the application at operation 206. When the processing logic detects the termination of the application execution, at operation 208, the capturing of the resources consumption data stops at operation 210.

At operation 212, the processing logic may determine whether the application terminated abnormally. If it is determined that the application terminated abnormally, the processing logic may send a report reporting the abnormal termination of the application at operation 214, discard the captured data at operation 216 and return to operation 204. If it is determined, at operation 212, that the application terminated normally, the processing logic generates the updated resources requirements data utilizing the captured data and any existing resources requirements data from the profile at operation 218. The application profile is then updated at operation 220.

Thus, in an example embodiment, once a profile for an application has been created and populated with resources requirements data, the profile may be updated every time the application successfully runs. This technique may allow for more accurate estimation of the amount of resources required to run an application.

The operations illustrated in FIG. 2 may be performed, in an example embodiment, by a component such as the profile manager 140 of FIG. 1. Example details of an example of a profile manager are described with reference to FIG. 3.

Figure 3:
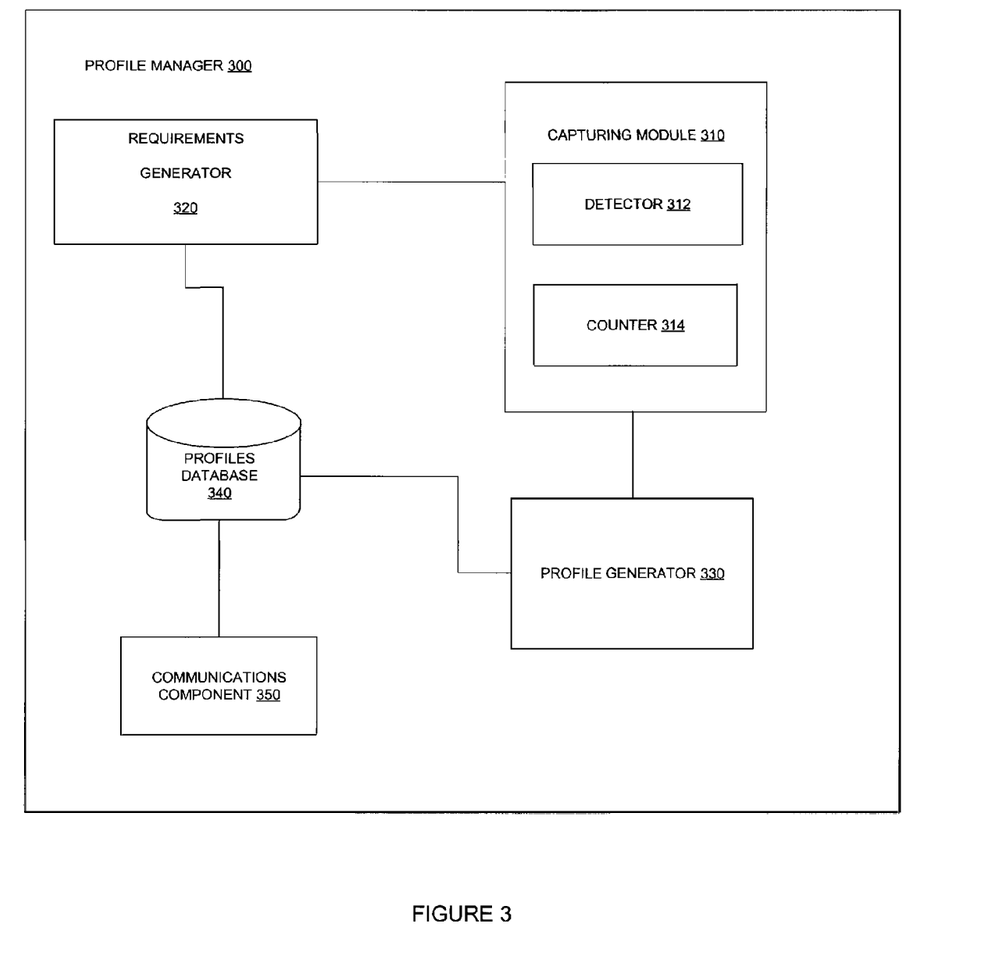
FIG. 3 shows a profile manager, in accordance with an example embodiment.

FIG. 3 is a block diagram of a profile manager 300, according to an example embodiment. As discussed above, a profile manager may be embedded in the requesting application itself. Alternatively, a profile manager may be provided as a stand alone component residing, e.g., on a server or on a client. A profile manager may, in some embodiments, be packaged with a scheduler.

As shown in FIG. 3, the profile manager 300, in an example embodiment, comprises a capture module 310 to capture resources consumption data for an application. The data collected by the capture module 310 may be provided to a requirements generator 320. The requirements generator 320 may be configured to generate the resources requirements data for the application based on the captured resources consumption data. The resources consumption data and the resources requirements data for the application may be utilized by a profile generator 330 to generate or update a profile for the application. In an example embodiment, the profile for the application may be stored in a profiles database 340.

The profile, in an example embodiment, may include a record of resources (e.g., ports, bandwidth, memory, disk space, or the like) that have been consumed by the application in earlier invocations of the application. For example, such information may include the number of voice ports utilized for a conference call or the amount of memory consumed in the course of the application execution. The profile may, in an example embodiment, store a rolling average of past resource consumption, it may contain a detailed log listing individual invocations and resource consumptions, or the like. The profile may persist and transcend the individual invocations of the applications and may include a plurality of resources requirement data, where each instance of the resources requirement data is associated with a particular running environment.

The capture module 310 may include, in an example embodiment, a detector 312 to detect the start and the termination of the application execution and a counter 314 to keep track of the amount of resources (and, optionally, specific details of the resources) consumed by the application in the course of its execution. The counter 314 may be configured to recognize whether the subject application has terminated abnormally and, if so, discard the collected data associated with the amount of resources consumed by the application from the start of the application execution to the abnormal termination of the application. The capture module 310, in an example embodiment, provides the captured data to the requirements generator 320 and to the profile generator 330 responsive to each successful execution of the application. Thus, each time the subject application is being executed, the requirements generator 320 may update the resources requirement data in the application's profile.

The profile manager 300 may further include a communication component to obtain profile information from the profiles database 340 and to provide such information to a scheduler in a distributed environment.

Although the embodiments of the present invention are presented in this description in the context of the management of distributed resources, it will be appreciated that the method and system described herein may be advantageously utilized for a variety of purposes, such as, for example, generating performance reports, analyzing network capability, as well as other practical applications. Embodiments, as described in the present description, may be utilized advantageously in Grid environments as well as in autonomic environments.

Figure 4:
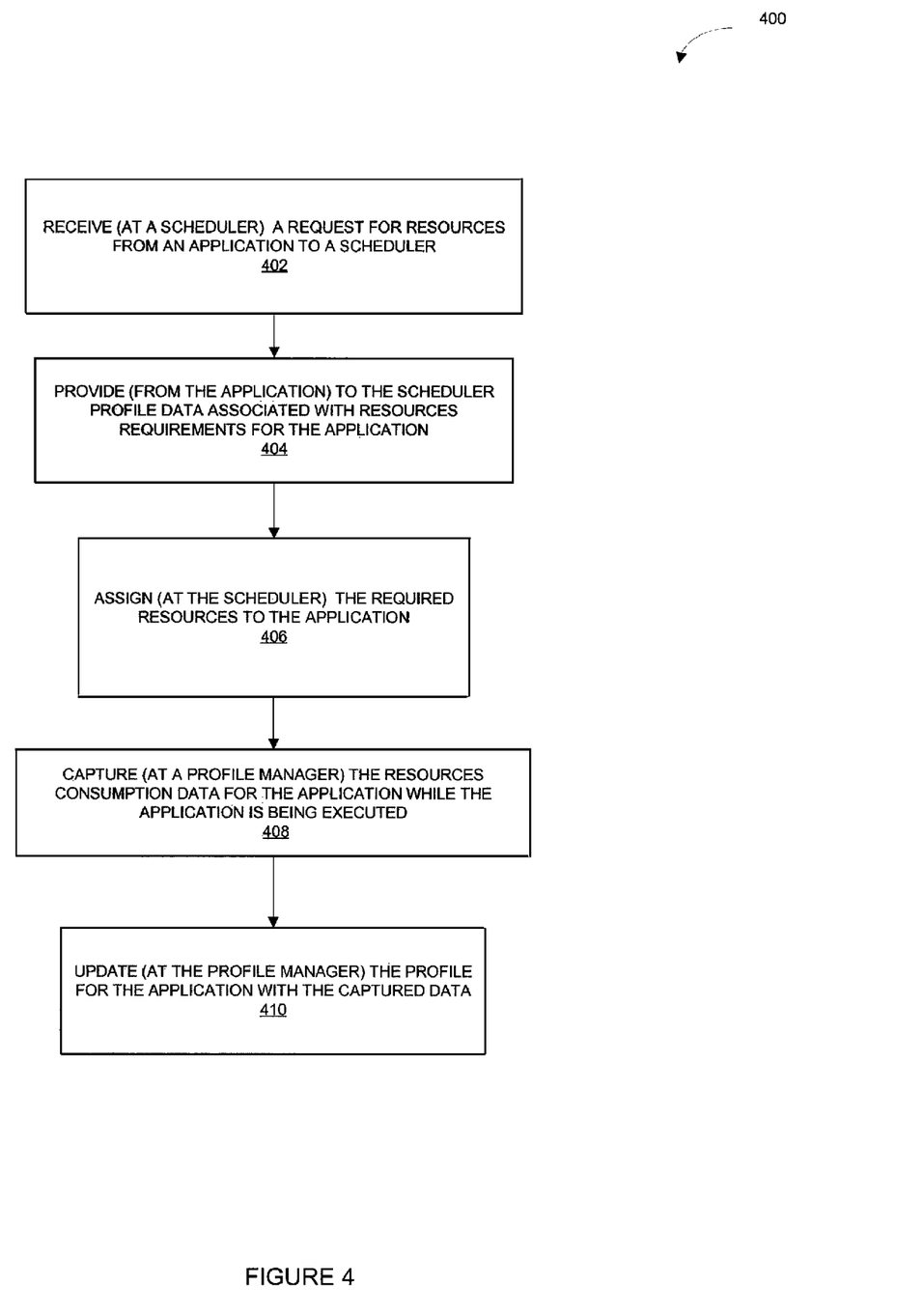
FIG. 4 shows a method, in accordance with an example embodiment, to manage distributed resources.

FIG. 4 is a flow chart of a method 400 to manage distributed resources utilizing an application profile in conjunction with a scheduler, e.g., in a Grid environment. The method 400 may be performed by processing logic that may comprise hardware (e.g., dedicated logic, programmable logic, microcode, etc.), software (such as run on a general purpose computer system or a dedicated machine), or a combination of both. In an example embodiment, processing logic resides at a computer system that hosts the profile manager 140 of FIG. 1. In an example embodiment, the processing logic may reside at a client 110, at a server 120 or may be distributed between a client 110 and a server 120 of FIG. 1.

Referring to FIG. 4, when the profile manager 300 detects a request for resources from an application to a scheduler (operation 402), the profile manager 300 then provides to the scheduler profile data associated with resources requirements for the application (operation 404). As described above by way of example with reference to FIG. 2, the profile manager 300 may capture the resources consumption data for the application while the application is being executed (operation 406). When the profile manager 300 detects a successful termination of the application (operation 408), the profile manager 300 may update the profile for the application (operation 410) so that the updated data may be provided to the scheduler next time the application requests resources. An example implementation of the method 400 is provided below.

For the sake of simplicity, and without loosing the generality, consider an application A, running on an environment E between t1 and t2, for a duration t =t2−t1. The tuple <A, E, t>, in this example, defines the duration requested by an application A to run on environment E. An application may run on multiple environments Eenv ={E1, E2, . . . Ek}. For each environment, and according to the particular set of data and other environmental conditions, an application may hold information on the minimum execution time $t_{min}$ and the maximum execution time t_max experienced when running the application on that environment. For every E in Eenv, an application may hold a set of tuples <A, E, t_min, t_max>. An application may be programmed not to retain those of the environments where the running time for the application exceeded a given threshold. An application may be also programmed not to retain an environment information at all. For example, every time an application is presented to a scheduler, it may expose the set of tuples associated with the past executions.

In order to present a scheduler with a set of tuples associated with the past executions, the following algorithm may be added to an application. Assume an application is scheduled to run on the environment Ej. An initial calibration is needed for each E, without an impact on the general mechanism. An application tuple <A, E, t> originally presents an estimated duration "t." After the first execution, t_exec is determined, and the application tuple becomes <A, E, t, t_exec>. After the second execution, t'_exec is determined, and the application tuple is defined as <A, E, t, t_exec, t'_exec>. Finally, information regarding past executions such as t_min=min (t_exec, t'_exec) and t_max=max (t_exec, t'_exec) may be provided to the scheduler, while the originally introduced estimated duration 't' may be neglected. Then, the mechanism to request resources may consider the Eenv as a list of <A, E, t_min, t_max> without losing the generality.

```
Example Calibration
    get t_exec
    get t'_exec
    gestablish t_min, t_max
    enter E in Eenv with t_min, t_max
Example Initialization
    vars: t_initial, t_final, t_min, t_max, delta
    If Ej is not in Eenv, then
        add Ej <t_min := null, t_max := null> to Eenv
    read in t_min and t_max from Eenv for current
application(A)/environment(Ej)
Start
    t_initial := environment clock
Stop
    t_final := environment clock
    delta := t_final − t_initial
```

```
-continued if (delta > threshold)
        send message <<unnacceptable_duration>,
        <Ej, delta t_start>>
        exit
    if (t_min == null)
        t_min := delta
    else if (t_max == null)
        t_max := delta
        if (t_max < t_min)
            swap(t_max, t_min) //if first run was longer than second run
    else
        if (t_min > delta)
            t_min := delta
        if (t_max < delta)
            t_max := delta
    write (A, Ej, t_min, t_max) to Eenv
Example History update
    If delta < t_min, then
        make t_min = delta
    If delta > t_max, then
        make t_max = delta
Example Stop mechanism
    exit with Eenv updated
Example Additional behavior
    If delta > thrs_0
        mark Ej [remove Ej from the Eenv]
        exit with original t_min and t_max
        send message <<unnacceptable_duration>, <Ej, delta, t_start>>
```

In the example provided above the algorithm and the data associated with it are recorded by the application itself. For statistical purposes, the data can be delivered to analytical tools to eventually optimize the next scheduling.

Figure 5:
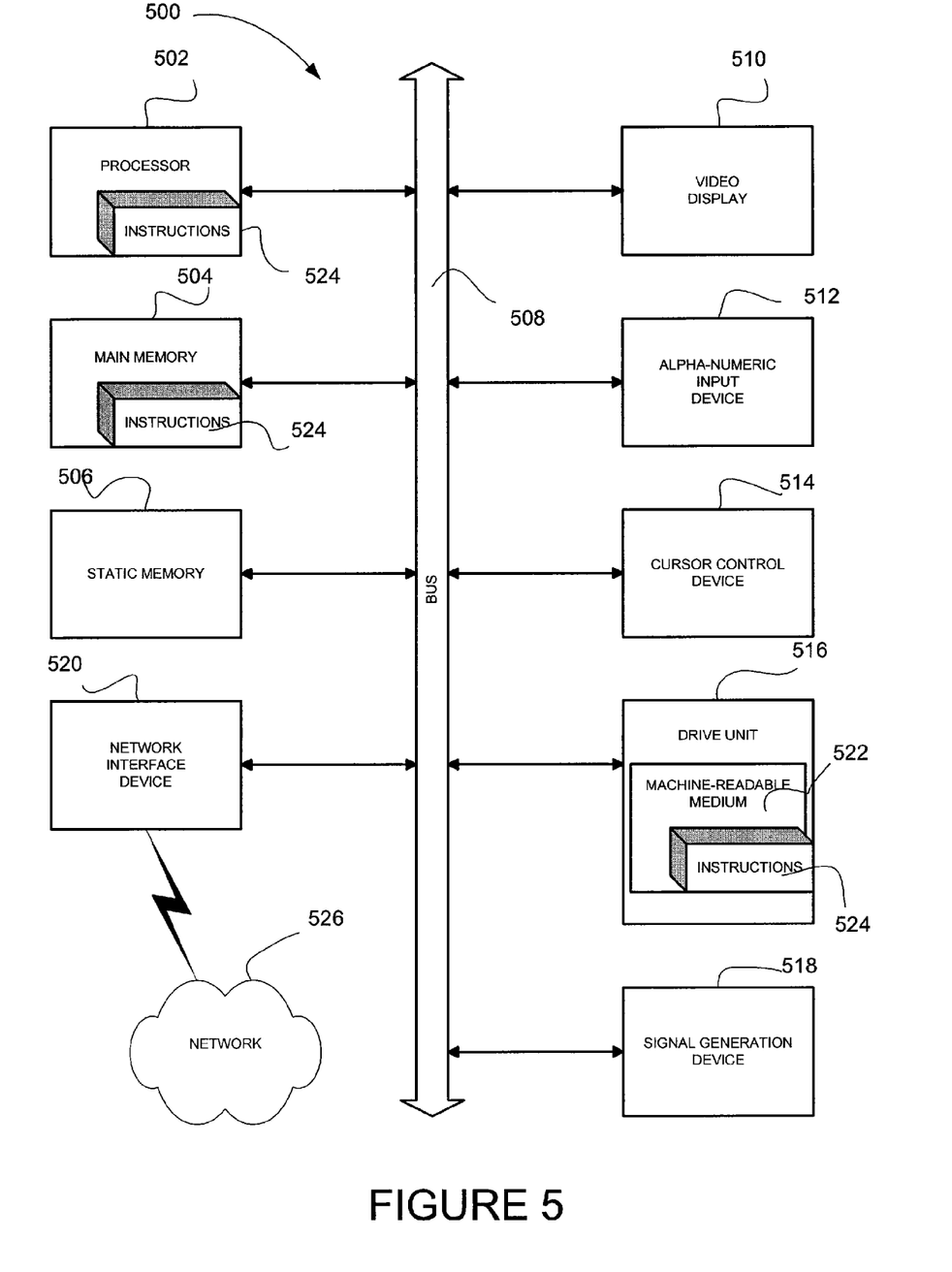
FIG. 5 illustrates a diagrammatic representation of an example machine in the form of a computer system within which a set of instructions, for causing the machine to perform any one or more of the methodologies discussed herein, may be executed.

FIG. 5 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system to profile applications, the system comprising:
   a capture module to capture resources consumption data for an application;
   a requirements generator to update resources requirement data in a profile for the application utilizing the resource consumption data, the profile for the application to be further updated in response to further invocations of the application;
   a detector to detect a start of the application execution and a termination of the application; and
   a resources counter to:
      determine an amount of resources consumed by the application from the start of the application execution to the termination of the application, wherein the amount of resources consumed provides the consumption data,
      detect abnormal termination of the application, and
      discard data associated with the amount of resources consumed by the application from the start of the application execution responsive to abnormal termination of the application.

2. The system of claim 1, comprising a profile generator to generate the profile for the application, the profile comprising seeded resources consumption data and seeded resources requirement data.

3. The system of claim 2, wherein the profile generator is to associate the resources requirement data with a shared network environment.

4. The system of claim 2, comprising a profiles database to store the profile for the application.

5. The system of claim 1, wherein the requirements generator is to update the resources requirement data responsive to detecting new resources consumption data.

6. The system of claim 1, wherein the resources requirement data comprises a required execution duration for the application.

7. The system of claim 1, comprising a communication component to provide the resources requirement data to a scheduler in a distributed network environment.

8. A method to profile applications, the method comprising:
   using one or more processors to perform operations of:
   capturing resources consumption data for an application;
   generating resources requirement data for the application utilizing the resources consumption data;
   updating a profile for the application utilizing the captured resources consumption data and the generated resources requirement data, the profile to be further updated in response to further invocations of the application;
   detecting a start of the application execution
   initiating a resources counter responsive to the detecting of the start of the application execution;
   detecting abnormal termination of the application; and
   responsive to the detecting of the termination of the application, discarding an amount of resources consumed by the application from the start of the application execution to the abnormal termination of the application.

9. The method of claim 8, comprising generating the profile for the application, the profile comprising seeded resources consumption data and seeded resources requirement data.

10. The method of claim 8, further comprising associating the resources requirement data with a shared network environment.

11. The method of claim 8, wherein the generating of the resources requirement data comprises updating the resources requirement data responsive to detecting new resources consumption data.

12. The method of claim 8, wherein the resources requirement data comprises a required execution duration for the application.

13. The method of claim 8, comprising providing the resources requirement data to a scheduler in a distributed network environment.

14. A non-transitory computer-readable medium having stored thereon data representing sets of instructions which, when executed by a machine, cause the machine to:
   capture resources consumption data for an application;
   generate resources requirement data for the application utilizing the resource consumption data;
   update a profile for the application utilizing the captured resources consumption data and the generated resources requirement data, the profile to be further updated in response to further invocations of the application;
   detect a start of the application execution and a termination of the application; and
   determine an amount of resources consumed by the application from the start of the application execution to the termination of the application, wherein the amount of resources consumed provides the consumption data;
   detect abnormal termination of the application; and discard data associated with the amount of resources consumed by the application from the start of the application execution responsive to abnormal termination of the application.

15. A system to profile applications, the system comprising:
- means for capturing resources consumption data for an application;
- means for generating resources requirement data for the application utilizing the resources consumption data;
- means for detecting a start of the application execution and a termination of the application;
- means for initiating a resources counter responsive to the detecting of the start of the application execution;
- means for detecting abnormal termination of the application; and
- means for responsive to the detecting of the abnormal termination of the application, discarding an amount of resources consumed by the application from the start of the application execution to the abnormal termination of the application.

* * * * *

UNITED STATES PATENT AND TRADEMARK OFFICE
CERTIFICATE OF CORRECTION

| | |
|---|---|
| PATENT NO. | : 8,255,535 B2 |
| APPLICATION NO. | : 11/460933 |
| DATED | : August 28, 2012 |
| INVENTOR(S) | : Dini et al. |

It is certified that error appears in the above-identified patent and that said Letters Patent is hereby corrected as shown below:

In column 8, line 26, in claim 8, after "execution", insert --;--, therefor

Signed and Sealed this
Twenty-seventh Day of November, 2012

David J. Kappos
*Director of the United States Patent and Trademark Office*